Sept. 26, 1950      R. R. LOVE      2,523,870
STEERING WHEEL MOUNTING FOR FARM IMPLEMENTS
Filed Aug. 4, 1948
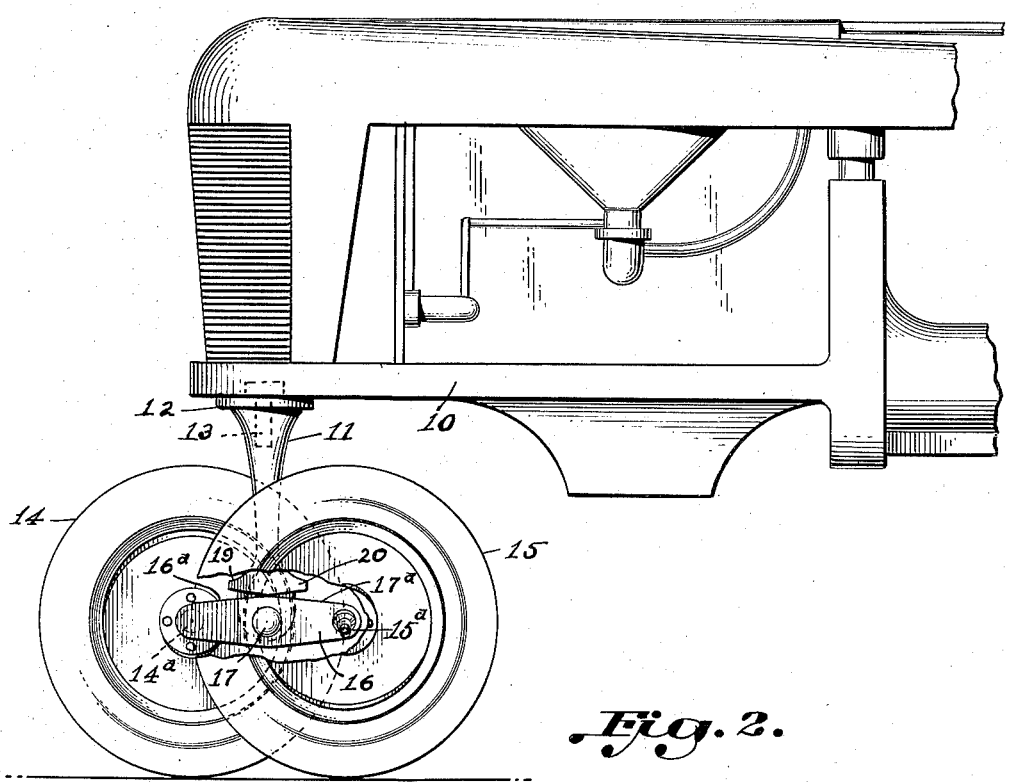
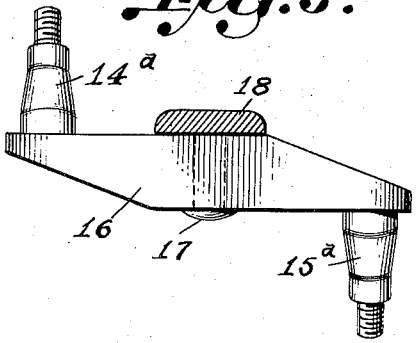
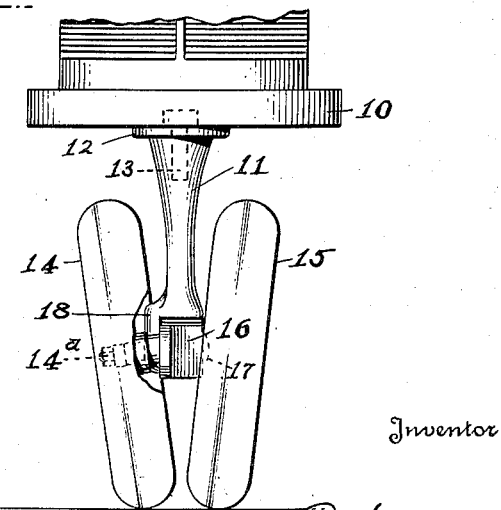
Inventor
Richard R. Love
By Munn, Liddy, Slaccum & Rich
ATTORNEYS Patented Sept. 26, 1950

2,523,870

UNITED STATES PATENT OFFICE 2,523,870

STEERING WHEEL MOUNTING FOR FARM IMPLEMENTS

Richard R. Love, Buhl, Idaho

Application August 4, 1948, Serial No. 42,512

4 Claims. (Cl. 280—87)

My invention has for its object to provide an improved arrangement for mounting the front end of a farm implement such as tractors and the so-called "combines" whereby the tossing movement of the vehicle and the attendant vibration thereof resulting from its up and down movement when traveling over an irregular ground surface is reduced to a minimum.

Another object of my invention resides in the provision of a pair of wheels mounted in an overlapping position on an arm journaled at an intermediate point and permitted a limited swinging movement in a vertical plane.

To these and other ends my invention comprises further improvements and advantages as will be further described in the accompanying specification, the novel features thereof being set forth in the appended claims.

In the drawings:

Figure 1 is a side elevation showing for the purpose of illustration the forward end of a farm tractor and a front wheel support therefor embodying my invention.

Figure 2 is a front view of said supporting wheels, and

Figure 3 is a plan view of the rocker arm carrying the axles on which the wheels are journaled.

Similar reference numerals, in the several figures indicate similar parts.

As illustrative of a type of vehicle to which my invention may be advantageously applied I have shown a farm tractor comprising a frame 10 having at its forward end a depending vertical pedestal 11 supported on the wheels by means of which the vehicle is steered, this object being accomplished by mounting the pedestal for rotation in opposite directions about a vertical axis and controlling this movement by any suitable operating devices manually operated by the driver, as will be understood. To this end the pedestal has a broad top 12 movably bearing against the lower face of frame 10 and secured thereto by a king pin 13.

The lower end of the pedestal is cut away at one side to form a shoulder extending in the direction of movement of the vehicle and a depending finger, the latter carrying the pivot for the wheel mounting and the former serving as stops for limiting their rocking movement.

The front end of the vehicle is supported on two wheels 14—15 arranged side by side one being somewhat in advance of the other, as shown in Fig. 1. The diameter of the wheels in relation to their centers of rotation I deem to be important as these factors determine the effectiveness of their operation and what I wish to designate as their close coupling. As seen in Fig. 1 each wheel overlaps the other. While the extent of the overlapping of the wheels may vary with their diameter and the distance between their axes on the bar 16 I have found in practice that this distance should be appreciable and if it approximates one half the diameter of the wheels very easy riding qualities will be imparted to the vehicle and the desired close coupling maintained. By this wheel arrangement it will be seen that in traversing minor irregularities in the ground surface of a field, such as irrigation ditches, the bottoms of the wheel peripheries will either span the side walls or edges thereof, or in traversing the ditches will automatically shift the weight, or part of the weight, carried from one wheel to the other.

The wheels are journaled on axes 14a—15a projecting laterally in opposite directions from the ends of a rock arm 16 pivoted on a stud 17 carried by a finger portion 18 depending from the lower end of the pedestal 11. Directly above the stud 17 the pedestal is provided with forwardly and rearwardly extending projections 19—20 with which the upper edge of the rock arm 16 engages to limit its oscillatory movement. To this end the upper edge of said arm is inclined or beveled downwardly from its center above its bearing point on the stud 17, as indicated at 16a, and likewise inclined rearwardly, as indicated at 17a. Correspondingly the proximate faces of the pedestal projections 19—20 are inclined or chamfered upwardly.

The axes of the two wheels are located equidistant from the pivot 17 of the cross arm. These may be inclined downwardly if it is desired to provide an exaggerated castor effect to bring the lower edges of the wheels nearly together, as shown in Fig. 2, to facilitate the steering of the vehicle when making sharp turns.

In the operation of my improved steering wheel mounting for farm tractors it will be seen that as the forward wheel 14 passes into a shallow ditch or declivity the cross arm 16 will rock on its pivot 17 and that the load of the vehicle is either distributed between the two wheels or is carried on the rear offset wheel 15. As the forward wheel travels out of the depression and the rear wheel enters it the arm 16 rocks in the opposite direction. In either of these positions of arm 16 there is but little if any up and down movement imparted to the pivot point 17 thus greatly reducing the vibration imparted by irregular terrain to the front end of the vehicle.

It will be appreciated that this lessening of the vibration in a farm implement is particularly advantageous in crossing corrugations in irrigated fields and greatly adds to the serviceable life of such machines per se and to the equipment carried thereon.

I claim:

1. A steering wheel mounting for tractors comprising an oscillatory vertical pedestal having a horizontal shoulder extending in the direction of travel of the vehicle and provided with a finger portion depending at one side of the shoulder, a cross arm pivoted at its mid point to said finger and rockable in a vertical plane beneath the shoulder, axles extending laterally in opposite directions from the ends of the arms and separate wheels mounted on the axles, each of which overlaps the other.

2. A steering wheel mounting for tractors comprising an oscillatory vertical pedestal having a horizontal shoulder extending in the direction of travel of the vehicle and chamfered at each side of its center point, a finger at one side of the pedestal depending below the shoulder, a cross arm pivoted thereto beneath the center point of the shoulder and having an upper edge beveled in opposite directions to provide surfaces cooperating with said chamfers to limit its rocking movement, axles extending laterally from opposite sides of the ends of the cross arm and wheels journaled on said axes, the rear and forward edges of said wheels overlapping each other.

3. A steering wheel mounting for tractors comprising an oscillatory vertical pedestal, a horizontal cross arm pivoted intermediate its ends to the lower end of the pedestal offset from the oscillatory axis thereof, an axle extending from each end of the cross arm and on opposite sides thereof, said axles being spaced equidistantly from said pivot point, wheels journaled on said axles closely adjacent the said ends of the cross arm so that each of the wheels overlaps the other.

4. A steering wheel mounting for tractors comprising an oscillatory vertical pedestal, a horizontal cross arm pivoted intermediate its ends to the lower end of the pedestal, axles extending from opposite sides of the cross arm and spaced equidistantly from said pivot point, each of the axles having a wheel journaled thereon at a point closely adjacent the ends of the arm, and means on the pedestal cooperating with the cross arm for limiting the pivotal movement thereof.

RICHARD R. LOVE.

REFERENCES CITED

The following references are of record in the file of this patent:

UNITED STATES PATENTS

| Number | Name | Date |
| --- | --- | --- |
| 2,197,273 | Lindeman | Apr. 16, 1940 |
| 2,222,857 | Ronning | Nov. 26, 1940 |
| 2,244,510 | Anderson | June 3, 1941 |
| 2,350,593 | Cunningham | June 6, 1944 |